United States Patent [19]
Minh et al.

[11] Patent Number: 5,162,167
[45] Date of Patent: Nov. 10, 1992

[54] APPARATUS AND METHOD OF FABRICATING A MONOLITHIC SOLID OXIDE FUEL CELL

[75] Inventors: Nguyen Q. Minh, Fountain Valley; Craig R. Horne, Redondo Beach, both of Calif.

[73] Assignee: Allied-Signal Inc., Morris Township, Morris County, N.J.

[21] Appl. No.: 580,886

[22] Filed: Sep. 11, 1990

[51] Int. Cl.$^5$ .............................................. H01M 8/10
[52] U.S. Cl. .................................. 429/30; 29/623.3; 29/623.4; 429/32
[58] Field of Search ............ 29/623.3, 623.4; 429/30, 32

[56] References Cited

U.S. PATENT DOCUMENTS

| | | | |
|---|---|---|---|
| 2,627,534 | 2/1953 | Arbogast | 136/175 |
| 4,087,905 | 5/1978 | Cooper et al. | 29/623.1 |
| 4,118,860 | 10/1978 | Buckler et al. | 29/623.5 |
| 4,125,686 | 11/1978 | Kinsman | 429/152 |
| 4,173,066 | 11/1979 | Kinsman | 29/623.1 |
| 4,233,371 | 11/1980 | Dorrestijn | 429/152 |
| 4,276,355 | 6/1981 | Kothmann et al. | 429/26 |
| 4,310,960 | 1/1982 | Parker | 29/157.3 |
| 4,476,196 | 10/1984 | Poeppel et al. | 429/32 |
| 4,476,197 | 10/1984 | Herceg | 429/32 |
| 4,476,198 | 10/1984 | Ackerman et al. | 429/32 |
| 4,499,663 | 2/1985 | Zwick et al. | 29/623.1 |
| 4,510,212 | 4/1985 | Fraioli | 429/30 |
| 4,666,798 | 5/1987 | Herceg | 429/32 |
| 4,749,632 | 6/1988 | Flandermeyer et al. | 429/12 |
| 4,761,349 | 8/1988 | McPheeters et al. | 429/39 |
| 4,799,936 | 1/1989 | Riley | 29/623.1 |
| 4,816,036 | 3/1989 | Kotchick | 429/30 |
| 4,857,420 | 8/1989 | Maricle et al. | 429/30 |
| 4,913,982 | 4/1990 | Kotchick et al. | 429/30 |
| 4,997,726 | 3/1991 | Akiyama et al. | 429/30 |
| 5,009,763 | 4/1991 | Hise | 429/30 |
| 5,051,321 | 9/1991 | Kitagawa et al. | 429/30 |

Primary Examiner—William R. Dixon, Jr.
Assistant Examiner—Willie J. Thompson
Attorney, Agent, or Firm—David B. Abel; Terry L. Miller; Robert A. Walsh

[57] ABSTRACT

The invention details a two-step densifying process, method, and apparatus for making a solid oxide ceramic fuel cell. According to the invention, a limited number of anode-electrolyte-cathode cells separated by a single or trilayer interconnect are formed and densified. Subsequently, a plurality of the densified cells are stacked and further processed to form a monolithic array.

48 Claims, 5 Drawing Sheets

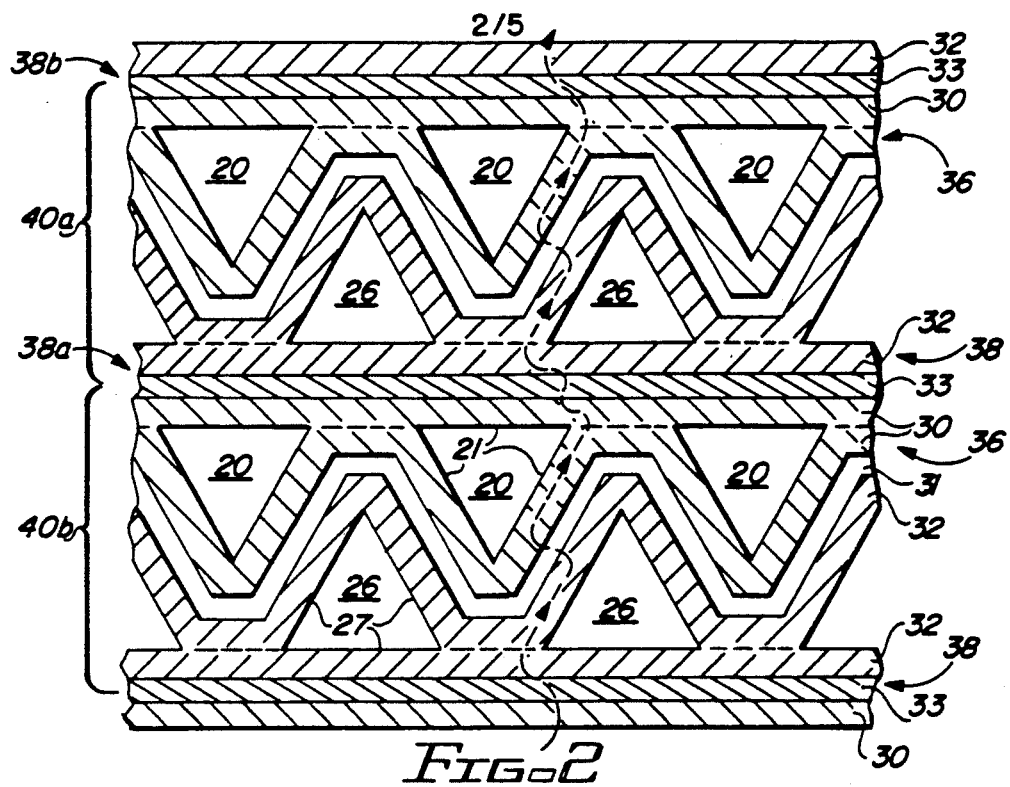
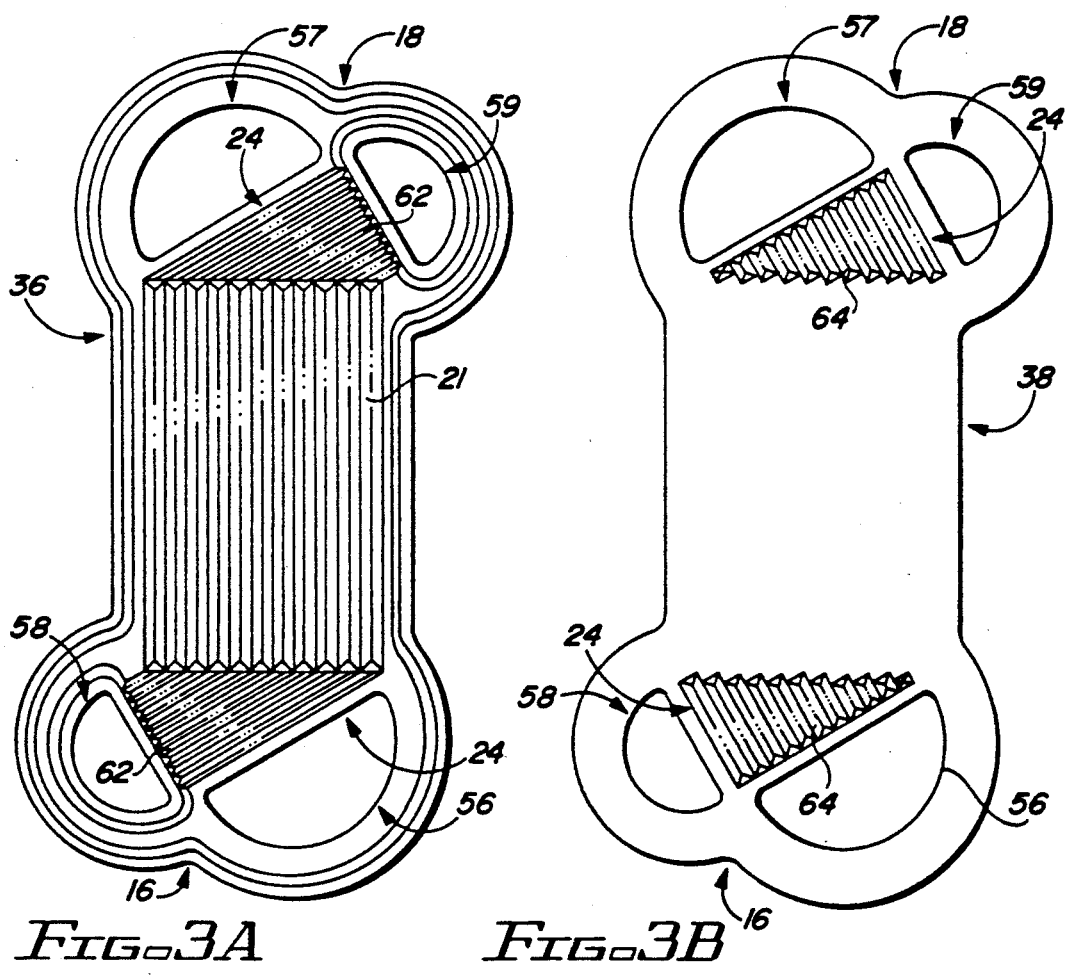

APPARATUS AND METHOD OF FABRICATING A MONOLITHIC SOLID OXIDE FUEL CELL

BACKGROUND OF THE INVENTION

The invention relates to solid oxide fuel cells and more particularly to a method of fabricating the fuel cell core. A fuel cell is basically a galvanic conversion device that electrochemically reacts a fuel with an oxidant within catalytic confines to produce a DC electrical output. In a fuel cell, cathode material defines the passageways for the oxidant and anode material defines the passageways for the fuel, and an electrolyte separates the cathode and anode materials. The fuel and oxidant fluids, typically as gases, are continuously passed through the cell passageways separated from one another. The fuel and oxidant discharges from the fuel cell generally remove the reaction products and heat generated in the cell. The fuel and oxidant are the working fluids and as such are typically not considered an integral part of the fuel cell itself.

The type of fuel cell for which this invention has direct applicability is known as the solid electrolyte or solid oxide fuel cell, where the electrolyte is in solid form in the fuel cell. In the solid oxide fuel cell, hydrogen or a hydrocarbon fuel is preferably used as the fuel and oxygen or air is used as the oxidant, and the operating temperature of the fuel cell is between 700° and 1,100° C.

The hydrogen passing through the fuel cell reacts with oxide ions on the anode to yield water, which is carried off in the fuel flow stream, with the release of electrons into the anode material. The oxygen reacts with the electrons on the cathode surface to form the oxide ions which then pas into the electrolyte material. Electrons flow from the anode through an appropriate external load to the cathode, and the circuit is closed internally by the transport of oxide ions through the electrolyte. The reaction process is well known and more thoroughly delineated in U.S. Pat. Nos. 4,499,663 and 4,816,036.

The electrolyte isolates the fuel and oxidant gases from one another while providing a medium allowing oxygen ion transfer, as well as voltage buildup on opposite sides of the electrolyte. Fuel and oxidant must diffuse away from the flow stream in the respective passageways to the electrolyte and react at or near the boundary of the electrodes (anode or cathode), and electrolyte, where electrochemical conversion occurs. The electrodes provide paths for the internal movement of electrical current within the fuel cell to the cell terminals, which also connect with an external load. The operating voltage across each cell is on the order of 0.7 volts so the individual cells must be placed in electrical series to obtain a useful load voltage.

U.S. Pat. No. 4,476,198 (Ackerman, et al) discloses a monolithic core consisting only of materials active in the electrochemical reactions. The thin composite core walls are shaped to define small passageways. If the core walls are constructed without deformation, they are predicted to have sufficient structural integrity to withstand the fluid pressures generated by gas flow through the passageways and the mechanical stresses due to the weight of the stacked core walls on one another. This monolithic construction would beneficially increases the power density of the fuel cell because of its reduced size and weight.

U.S. Pat. No. 4,476,196 (Poeppel, et al) discloses a monolithic core construction having the flow passageways for the fuel and for the oxidant gases extended transverse to one another. The core construction provides that only anode material surround each fuel passageway and only cathode material surround each oxidant passageway, each anode and each cathode material further being selectively sandwiched at spaced opposing sides between electrolyte and interconnect materials. These composite anode and cathode wall structures are alternately stacked on one another (with the separating electrolyte or interconnect material typically being a single common layer) whereby the fuel and oxidant passageways are disposed transverse or in a cross flow relationship to one another.

U.S. Pat. No. 4,510,212 (Fraioli) discloses a core construction having both parallel and cross flow paths for the fuel and the oxidant gases. Each interconnect wall of the cell is formed as a sheet of inert support material having therein spaced small plugs of interconnect material, the cathode and anode materials being formed as layers on opposite sides of each sheet and being electrically connected together by the plugs of the interconnect material. Each interconnect wall is formed into a wavy shape and then connected along spaced, generally parallel, line-like contact areas between corresponding spaced pairs of generally parallel electrolyte walls, operable to define one tier of generally parallel flow passageways for the fuel and oxidant gases. Alternate tiers are arranged to have the passageways disposed normal to one another.

Cellular type fuel cell cores (see U.S. Pat. No. 4,476,198) of the prior art are made by the process whereby the compositions used for the four materials are put into four distinct slurries. Each slurry is then placed in a reservoir of a squeegee-type device which is pulled over a flat surface and hardens or plasticizes into a layer of the material having the desired thickness. In this manner the electrolyte wall or interconnect wall is formed by a first layer of anode material followed by a layer of either electrode or interconnect material and finally by a layer of the cathode material. The layers are bonded together since the binder system is the same in each layer.

Related U.S. Pat. No. 4,816,036 (Kotchick) teaches another method of forming a cellular core, whereby the compositions for the four materials are individually mixed to a plastic consistency and subsequently hot rolled into thin sheets. The thin sheets can then be hot rolled into multilayer tapes, formed, stacked, and fired as a monolith to produce the fuel cell with integral fuel and oxidant manifolding.

Theoretically, the fuel cell stack structure of the above-noted patents should provide exemplary power density. However, problems arise because the fuel cell stacks are formed from arrays of anode and cathode sandwiching either an electrolyte or interconnect material in pliant or green form. The various green constituent layers are stacked on top of each other, appropriately oriented, to form the stack structure. The resultant stack structure is made up of all green, or unsintered, constituent parts. As noted, the components of the stack are made of different materials, and thereby requiring one to try to match the coefficient of thermal expansion and firing shrinkage for the different materials as closely as possible to one another to minimize separation problems. Fuel cell stacks which are made of green precursors which are all cosintered display poor performance due to microcracks which occur in the various layers as a result of the cosintering step if thermal expansion and firing shrinkage matched is not achieved. A resulting cosintered stack produces significantly less current than its theoretical current density due to mixing of reactant gases which is the direct result of the micro-cracks in the stack. In addition, it is difficult to densify the interconnect under conditions suitable for the other cell components. Inadequately densified interconnects allows cross-leakage of reactant gases.

A second problem arises when the multilayer fuel cell stacks of the prior art are densified in that there is migration of the ceramic materials, primarily the interconnect material, into adjacent layers. This migration of the ceramic materials adversely effects the resulting component physical properties of density, porosity, and homogeneity. A third problem is the slumping of the corrugations during co-firing. As the size of the fuel cell structure increases the green corrugated layers are not stiff enough to support the structure weight during the heat treatment process. Accordingly, a processing method and the resulting fuel cell which eliminate the problems of microcracks, ceramic migration, and slumping would be desirable.

SUMMARY OF THE INVENTION

This invention relates to a solid oxide fuel cell and particularly to an improved method of making a core and integral manifolding for such a cell. An object of this invention is to provide an improved method for making a solid oxide fuel cell core of a complicated and compact cross section having many adjacent small passageways for containing the fuel and oxidant gases.

The method of fabricating the fuel cell core comprises the steps of first, individually mixing the anode, cathode, electrolyte and interconnect materials with a binder system. Second, forming thin tapes of the individual layers by either roll milling or slurry tape casting. Third, forming green state multilayer tapes preferably comprising an anode electrolyte-cathode or an anode-interconnect-cathode. Fourth, cutting and molding the respective green state multilayer tapes into the desired net shape elements. Fifth, assembling and bonding pairs of anode-interconnect-cathode elements (or alternatively simply interconnect elements) and anode-electrolyte-cathode elements. Sixth, densifying the assembled pairs of elements. Seventh, stacking and bonding the densified pairs of elements by wetting the contacting surfaces with a bonding agent to promote interbonding of the contacting surfaces to form a stacked assembly. Finally, densifying the stacked assembly to form a monolithic core assembly.

BRIEF DESCRIPTION OF THE DRAWINGS

FIG. 2 is a partial, enlarged sectional view when taken along line 2—2 of FIG. 1;

FIGS. 3 A and B are plan views of the individual electrolyte and interconnect elements;

DETAILED DESCRIPTION OF THE INVENTION

Figure 1:
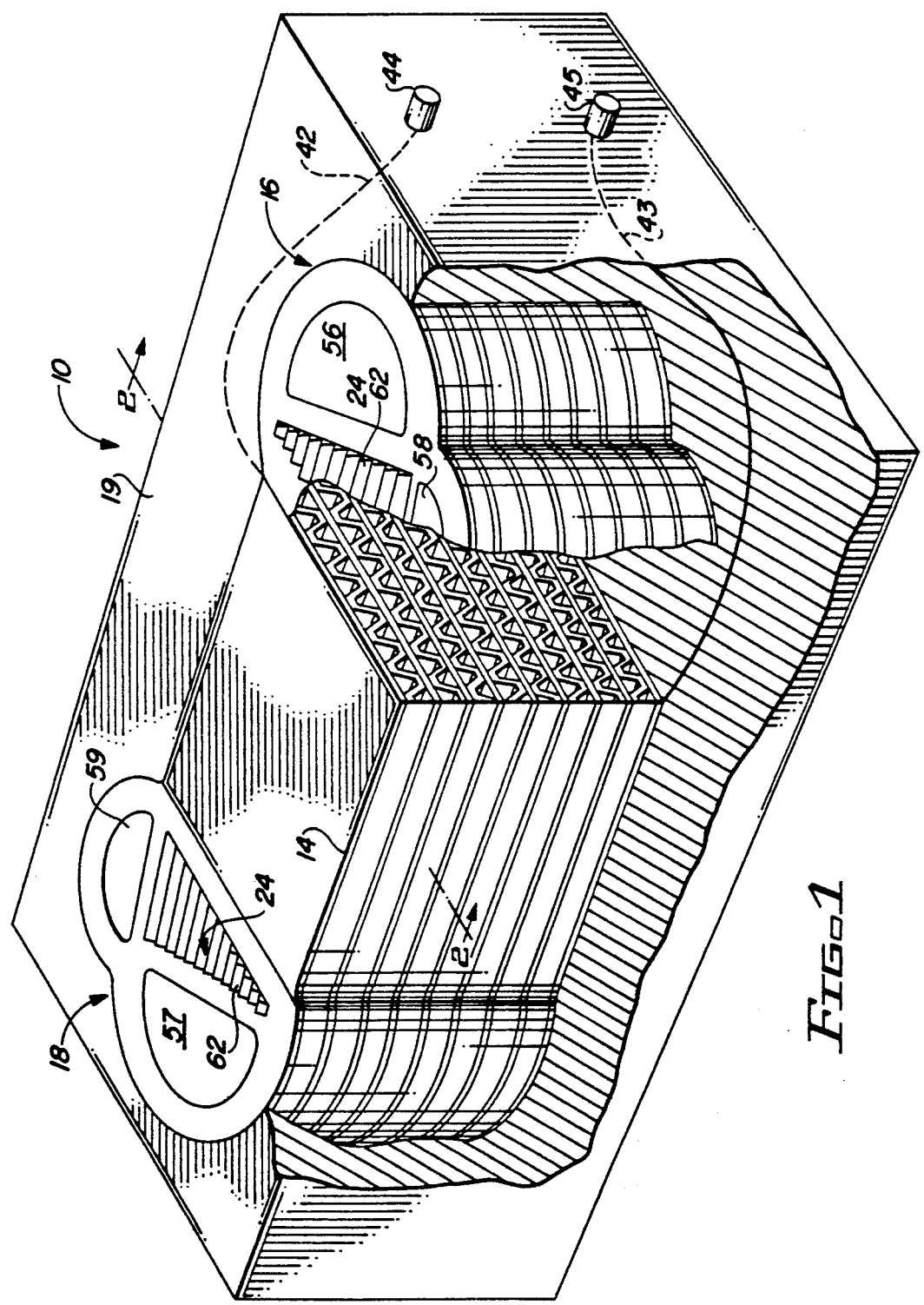
FIG. 1 is a perspective view, partially broken away for clarity of a fuel cell formed according to the present invention.

FIG. 1 shows a monolithic solid oxide fuel cell (MSOFC) 10 of the present invention including a fuel cell core 14 and inlet and outlet manifolding, 16 and 18, at each end of the core 14. The core and manifolds are located within and surrounded by suitable insulation 19. Not shown are supply lines connected to suitable fuel and oxidant sources.

FIG. 2 illustrates an enlarged cross-section of the fuel cell core 14 for the MSOFC 10 of FIG. 1. Within fuel cell core 14 are formed a plurality of fuel passageways 20 and oxidant passageways 26 which are disposed parallel to one another and alternately adjacent one another. The fuel passageways 20 are preferably formed with only an anode material 30 defining the exposed fuel passageway walls 21 while the oxidant passageways 26 are preferably formed with only a cathode material 32 defining the exposed oxidant passageway walls 27. Adjacent fuel and oxidant passageways 20 and 26 are separated by either an electrolyte wall 36 or by an interconnect wall 38. The electrolyte wall 36 comprises thin layers of electrolyte material 3 sandwiched between the anode material 30 and the cathode material 32 forming a trilayer. The interconnect wall 38 comprises a thin trilayer of interconnect material 33 sandwiched between anode material 30 and cathode material 32 to form a trilayer. Two interconnect walls 38 can define the limit of one cell unit 40, however in the overall fuel cell 10, two adjacent cell units 40 share an interconnect wall 38.

The anode, cathode, electrolyte, and interconnect materials 30, 32, 31, and 33 are selected and modified to comply with the following requirements: (1) electrically conductive aspects of the cathode, anode, and interconnect; (2) the ionic transport and electronic isolation aspect of the electrolyte; and (3) the gas porosity property of the cathode and anode and the gas impervious property of the electrolyte and interconnect. Likewise the structural integrity, thermal expansion and contraction ratios, and chemical compositions of the composite monolithic core are designed for the specific operational parameters of temperature, pressure, gas flow rates, voltage, and current densities necessary to provide optimal efficiency.

In a preferred embodiment of the invention, the interconnect and the electrolyte layers are thin (0.002–0.005 cm) while the sandwiching cathode and anode layers are perhaps the same thickness or possibly up to perhaps ten times this thickness (0.002–0.05 cm).

The MSOFC 10 provides increased power density due to the increased active exposure areas of fuel and oxidant per the corresponding unit flow path volume, and due further to having only the active materials (the anode, cathode, electrolyte, and interconnect) in the fuel cell core 14. The fuel and oxidant passageways 20 and 26, of the core 14 can be very small, and likewise the fuel and oxidant passageway walls 21, 27 can be thin but yet self supporting over the small distances across the defined fuel and oxidant passageways 20, 26, making possible shorter current paths and reduced resistance losses, and minimizing diffusion losses by eliminating thick supports entirely.

The inlet and outlet manifolds, 16 and 18, each include an oxidant conduit 58, 59 and a fuel conduit 56, 57 and a turning section generally designated by the numeral 24. Turning section 24 defines a plurality of fuel manifold passages 62 and a plurality of oxidant manifold passages 64 as will be described later.

It is envisioned that the MSOFC 10 of the present invention can be used with parallel flow, counter flow or cross flow of the two working fluids. For the purpose of clarity it is assumed that a parallel flow system is being used and therefore manifold 16 shall be referred to as the inlet manifold defining a fuel inlet conduit 56 and an oxidant inlet conduit 58 and manifold 18 shall be referred to as the outlet manifold defining a fuel outlet conduit 57 and an oxidant outlet conduit 59. Each manifold further includes the turning sections 24.

Further to the above, it will be recognized by those skilled in the pertinent art that the electrochemically active fuel cell core of the MSOFC 10 is combined with conduits carrying fuel and oxidant to and from the fuel cell core 14, making a complete functional fuel cell when attached to electrical conductors 42, 43, and encased in the thermal insulation 19. The conductors 42, 43 extend through the insulation 29 to terminals 44, 45 external thereto.

Unfortunately, the manifolding of a fuel cell is conventionally not electrochemically active so that the power and weight density of the fuel cell suffer, especially in the case of a parallel flow fuel cell. Also, conventionally, the conduits of the fuel cell are separate pieces so that seals must be provided to prevent leakage of fuel and oxidant. As will be fully appreciated upon understanding this disclosure, these limitations of the conventional fuel cells are avoided by the preferred embodiments of the present invention.

Gaseous fuel is conveyed from a source (not shown) to the fuel inlet conduit 56 formed within the inlet manifold 16 for flow through the fuel manifold passages 62 and then through the fuel passageways 20 in the fuel cell core 14 toward the fuel outlet conduit 57 formed within the outlet manifold 18. Likewise, oxidant is carried from a source (not shown) to the oxidant inlet conduit 58 formed within the inlet manifold 16 for flow through the oxidant manifold passages 64 and in turn for flow through the oxidant passageways 26 toward the oxidant outlet conduit 59 formed within the outlet manifold 18. The fuel and oxidant react electrochemically across the electrolyte walls 36 separating the fuel and oxidant in the fuel cell core 14. Fuel and oxidant not consumed are discharged through the outlet manifold 18 and subsequently may be combusted with the other reaction products from the MSOFC 10 in an appropriate combustion chamber (not shown).

As can be best seen in FIG. 2, each electrolyte wall 36 is comprised of the layer of electrolyte material 31 sandwiched between the layer of anode material 30 and the cathode material 32. Electrolyte wall 36 electrochemically reacts the fuel and oxidant being conveyed in the fuel and oxidant passageways 20 and 26, respectively, to develop an electrical potential across the electrolyte wall 36. Further, for all of the electrolyte walls 36 thus confined between any pair of adjacent interconnect walls (38a and 38b, for example), there is an in-series electrical hookup of the cell units (40a, 40b, for example). The electrolyte walls 36 are corrugated, or backfolded between the interconnect walls 38 so that the fuel and oxidant passageways 20 and 26 are likewise alternately disposed between any pair of adjacent interconnect walls 38.

Shown in FIGS. 1 and 3 is the manifolding system to be used in association with the fuel cell core 14. The inlet manifold 16 and the outlet manifold 18 are similar to each other in their ducting of the fuel and oxidant flows. Each defines oxidant inlet and outlet conduits 58 and 59, and fuel inlet and outlet conduits 56 and 57, for connection to suitable oxidant and fuel sources. As will be described below the manifolding 16 and 18 and the fuel cell core !4 can be formed as an integral piece.

Shown in FIGS. 3A and 3B are fuel cell core walls having inlet and outlet manifolds 16 and 18 integral therewith. FIG. 3A discloses the electrolyte wall 36 and FIG. 3B discloses the interconnect wall 38. Shown in FIG. 3A are electrolyte wall impressions or corrugations 68 extending between the manifolds 16 and 18, and which, when alternatively stacked with the interconnect walls 38, form the fuel and oxidant passageways 20, 26. At each end of the corrugations 68 of the electrolyte wall 36 are a plurality of manifold corrugations 70 which extend parallel with each other and with the manifold corrugations 70 at the opposite end of the fuel and oxidant passageways 20, 26. Each manifold corrugation 70 has a height less than the height of the fuel and oxidant passageways 20 and 26 (see FIG. 5). Inlet and outlet fuel manifold passageways 62 extend from the ends of the fuel cell core fuel passageways 20 to the fuel inlet and outlet manifolds 16 and 18. Likewise, inlet and outlet oxidant manifold passageways 64 extend from the ends of the oxidant passageways 26 to the oxidant inlet and outlet conduits 58 and 59 formed internally to manifolds 16 and 18.

Figure 4:
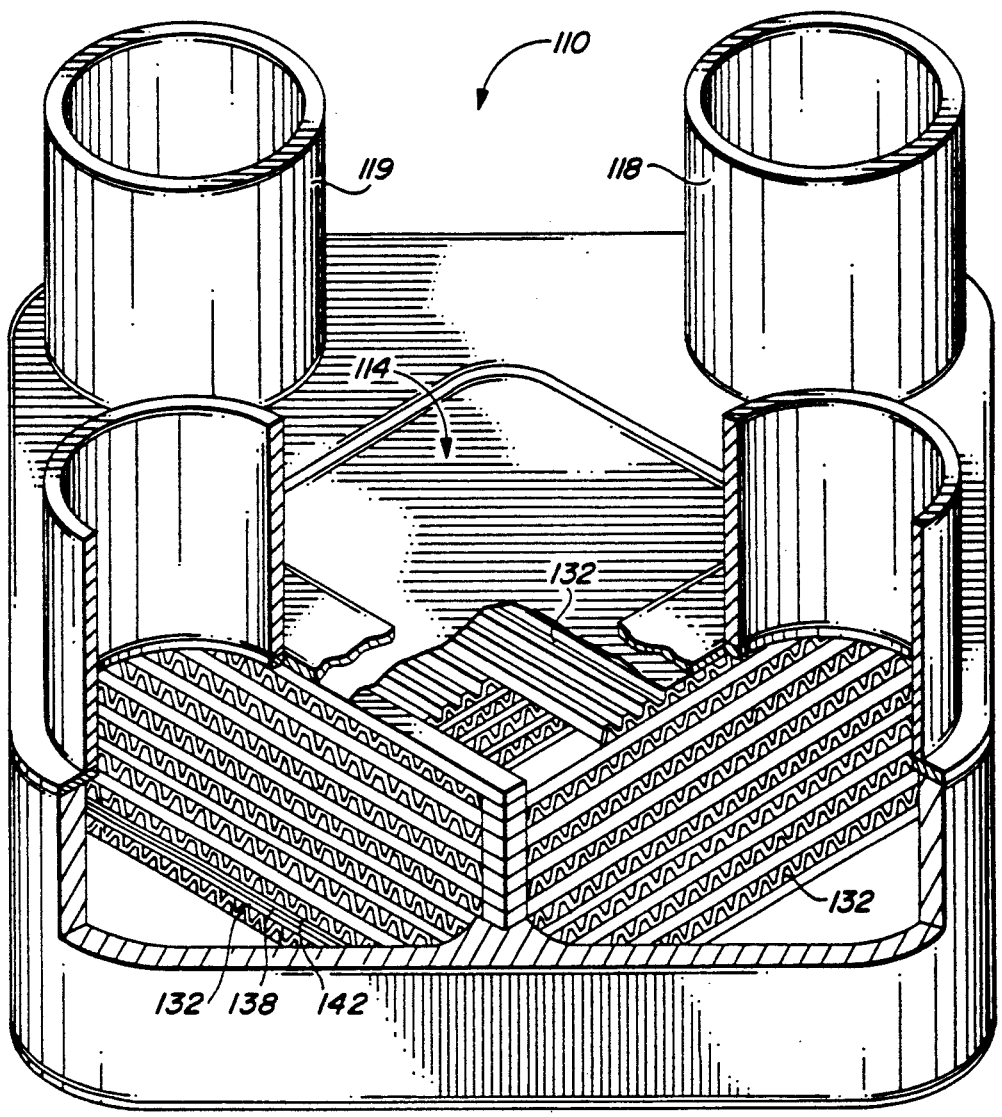
FIG. 4 is a perspective view of an alternative configuration for a fuel cell formed according to the present invention.
Figure 5:
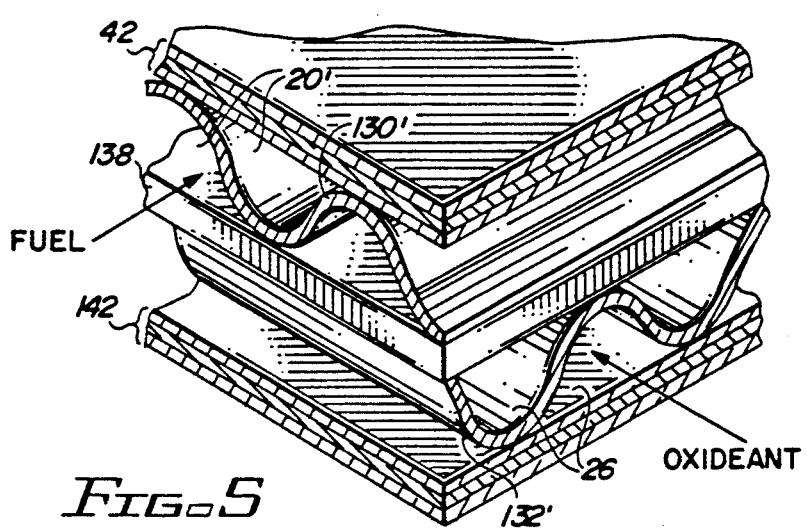
FIG. 5 is a partial, enlarged sectional view of a portion of the fuel cell of FIG. 4.
Figure 7A:
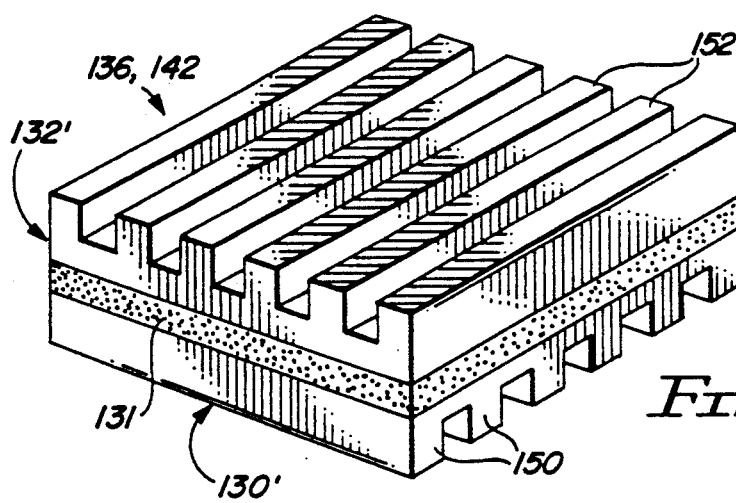
FIGS. 7 A, B, and C are exploded views of portions of alternative arrangements for the fuel cell core structure.
Figure 7B:
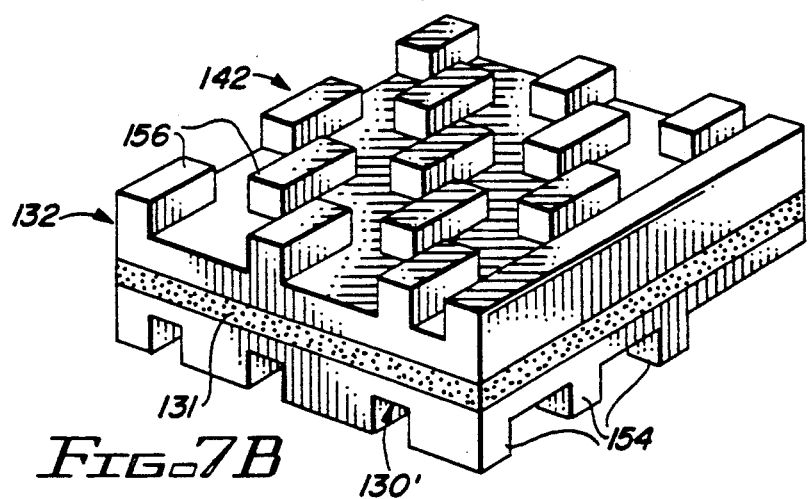
Figure 7C:
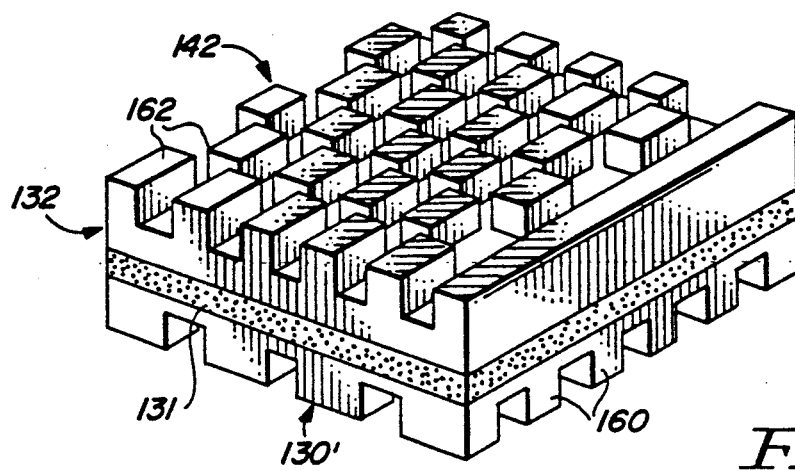

An alternative construction of a cross flow monolithic solid oxide fuel cell (MSOFC) 110 is depicted in FIG. 4 and exploded FIGS. 5 and 7, and including a core section 114, oxidant inlet manifold 116, fuel inlet manifold 117, oxidant outlet manifold 118 and fuel outlet manifold 119. An exploded portion of the cross flow MSOFC 110 is depicted in FIG. 5. In the cross flow MSOFC 110, an anode 130, electrolyte 136, and a cathode 132 are formed into an electrolyte trilayer 142. Another anode 130' and cathode 132' are formed into a corrugated, backfolded or ribbed (FIG. 7) configuration and attached to opposite sides of the electrolyte 131 or the electrolyte trilayer 142, adjacent the respective similar anode 130 and corrugated cathode 132. The corrugated anode 130' and cathode 132' layers are arranged with the corrugations at crossing angles to one another, preferably at right angles. Interconnect layers 138 are stacked and attached to the corrugated anode 130' and cathode 132' at opposite sides of the respective corrugations from the planar electrolyte trilayer 142. A plurality of these stacked elements form a complete cross flow MSOFC 110. The method of forming this cross flow MSOFC 110 is analogous to the method of forming the parallel flow configuration of FIGS. 1-3, as more fully discussed below.

PREFERRED METHOD OF FABRICATING THE FUEL CELL

Figure 6:
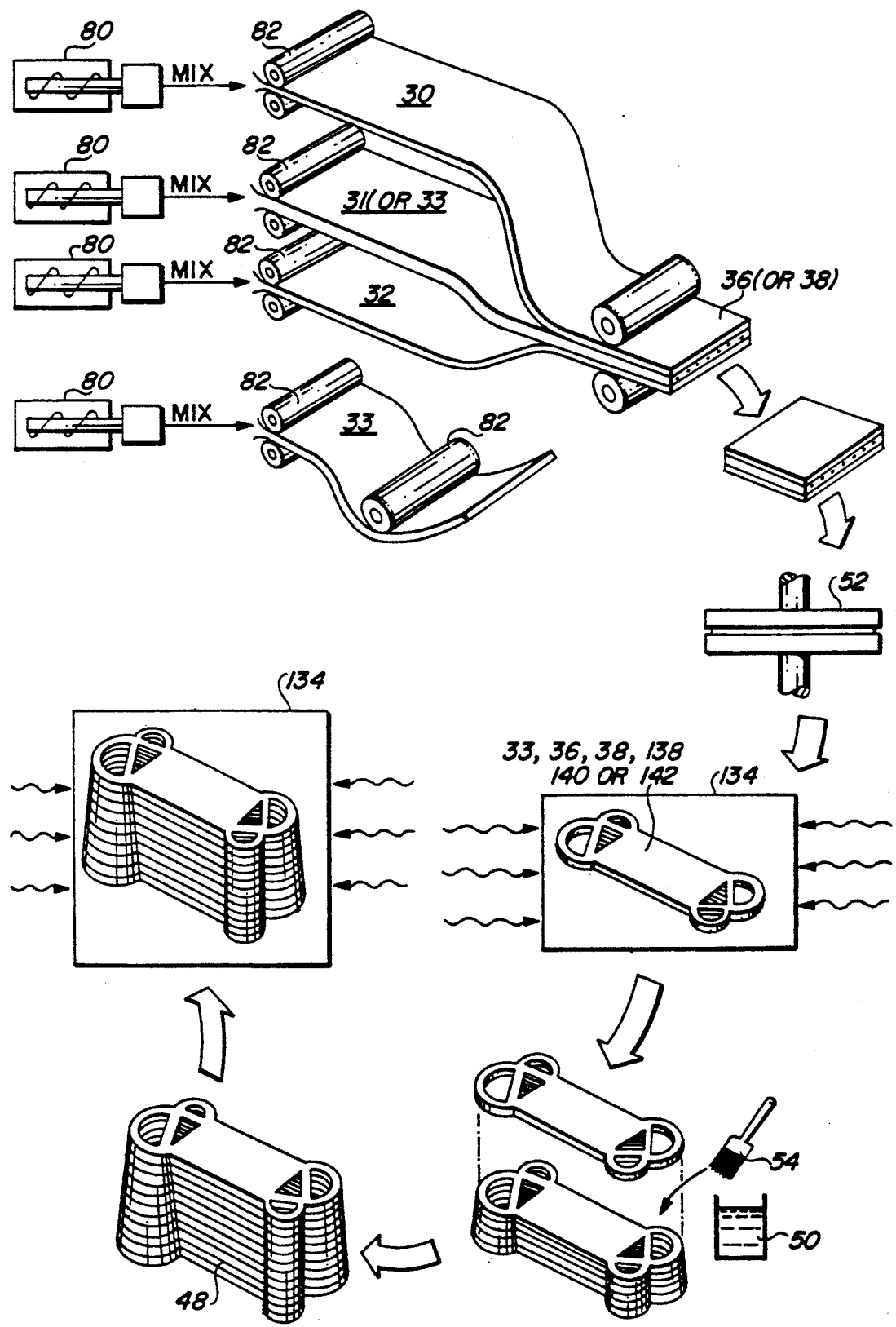
FIG. 6 is a diagrammatic depiction of the two-step firing process required to form a fuel cell of the present invention.

Shown in FIG. 6 is a schematic diagram of the process to manufacture a MSOFC 10 of the present invention. Ceramic powders for each of the materials: strontium-doped lanthanum manganite for the cathode, yttria-stabilized zirconia for the electrolyte lanthanum chromite-doped with magnesium, calcium cobalt, or strontium for the interconnect and a cermet of cobalt or nickel metal with stabilized zirconia for the anode, are first prepared so that the particle size ranges from approximately 1 micron to 10 microns. The respective powders are then mixed with a desired binder and plasticizer in a high intensity mixer 80. For example, to form the electrolyte material, zirconia and yttria are mixed in approximate percentages of 87 to 13 by weight. The binder and plasticizer make up approximately 10–40%, by weight, of the total mix and preferably approximately 18%. The amounts of binder and plasticizer being approximately equal. Porosity may be controlled by using larger sized particles, by the addition of pore formers, or by the use of the higher percentage of binder.

Typically, the binder used can be selected from the group comprising: synthetic rubber, thermosetting plastics, polyvinyl alcohol or polymer systems which thermally decompose without cross-linking. The plasticizer chosen is one that is pliable, elastic, and allows low temperature forming of the binder system, e.g. butyl benzyl phthalate, or solvents of the thalate group.

The ceramic powder, binder and plasticizer are combined in the high intensity mixer 80 at room temperature. The mixing disperses the ceramic powder particles and coats each ceramic particle with binder. The mixing action also raises the temperature through friction to 150° C. and softens the plasticizer. Typically, the time for mixing can be 0.5 to 10 minutes with 2 minutes generally being sufficient.

The mixed material is then removed from the mixer and formed into tapes, preferably immediately after mixing to retain the heat generated by the mixing. As shown, the tape forming step is carried preferably out by a roll mill 82. Alternatively, however, the tapes could be formed by other methods including extruding, pressing or tape casting. In the roll milling process, each roller is generally heated to approximately 10°–150° C., depending on the material and the desired thickness, to assist in the rolling operation. Each material i.e. the anode, cathode, electrolyte and interconnect materials, is individually roll milled into tapes 30, 32, 31 and 33 of the desired thickness. It should be noted that the numerals 30, 31, 32, and 33 will hereinafter designate the material as well as a tape or element formed of that material. Thereafter, a multilayer electrolyte or interconnect wall tape 36 or 38 is roll-milled from at least three of the other tapes, i.e. 30, 31 or 33, and 32. During this step each tape is friction bonded to the adjacent tape(s). It is important that no voids are formed between or within the respective tape layers during this rolling step. The resulting multilayer electrolyte or interconnect wall tapes 36, 38 may be further calendared if required to reduce the thickness.

To provide passageways for the fuel and oxidant through the MSOFC 10. The plurality of fuel and oxidant passageways 20, 26 are formed, for example extending along the anode 30 and cathode 32 respectively. In order to increase the efficiency of the parallel or counterflow MSOFC 10, 110, it is advantageous to form the passageways 20, 26 by corrugating the trilayer electrolyte tape 36 to achieve greater surface area. This can be accomplished by compression molding, vacuum forming or by gear forming. During this operation, it is important not to get any material flow, thereby retaining the desired layer thicknesses.

Alternatively, for the cross flow MSOFC 110 configuration of FIG. 4, a single trilayer electrolyte tape 142 is first formed preferably by the roll milling process or alternatively by a tape casting, extruding or pressing process. As shown for example in FIGS. 7 A, B, and C, ribs 150, 152; fins 154, 156; or posts 160, 162; may be formed in the exposed surface of the anode 130 and cathode 132 respectively by displacing contiguous portions of the respective surfaces of the anode 130 and cathode 132 from the plane of the pre-existing flat surface. This may be accomplished by compression molding or pressing, rolling, or by cutting groves into the trilayer electrolyte 142. As may be readily appreciated, the fins 154, 156 or posts 160, 162 may be so arranged as to force the respective fuel and oxidant to traverse a tortuous pathway along the surfaces of the trilayer electrolyte 142.

Alternatively, single layer sheets of anode 130' and cathode 132' may be first roll milled or tape cast, then formed by a compression molding or similar technique into a corrugated or backfolded configuration, for attachment to the trilayer electrolyte tape 142 as discussed below.

In addition, a planar single layer of interconnect 138, or an (anode-interconnect-cathode) interconnect trilayer 140, is formed by either the roll milling or tape casting processes described above. The resulting trilayer tapes 36, 38, 140, 142 and single layer tapes 130', 132', 138 for the respective parallel or crossflow assemblies are then cut or pressed into a plurality of individual elements having preferred gross net shapes (numbered similarly to their respective tapes from which the elements are formed). These gross net shapes preferably include the walls for the manifolds 16, 18, 116, 117, 118, and 119, as well as the corrugations for the passageways 20, 26, 62, 64, if required.

Next, a limited number of the trilayer electrolyte and interconnect elements 36, 38 for the parallel flow configuration, or a single trilayer electrolyte element 142 and one each of the anode elements 130', and cathode elements 132' are stacked and bonded to one another. This is preferably accomplished by wetting the contacting surfaces of the elements with a solution which will partially dissolve the entrained binder and/or plasticizer within the elements. By way of example, an isopropyl alcohol solution can be brushed or sprayed onto the elements to dissolve the binder. After the contacting elements are assembled, the alcohol solution evaporates and the binder joins the contacting surfaces. For the parallel flow configuration, the corrugated trilayer 36 electrolyte is bonded to the interconnect trilayer 38 (or interconnect layer 38'). For both the parallel flow and cross flow configurations, this process of joining the green state trilayer elements is preferably limited to less than ten complete cells, and optimally may be limited to single pairs of electrolyte trilayer elements 36 and interconnect trilayer elements 38 (or interconnect elements 38').

The assembled elements are then heat treated, preferably in a furnace or microwave oven 134, by any one or a combination of radiant, convective, or microwave heating to a temperature sufficient to sinter the respective anode, electrolyte, cathode and interconnect ceramics. During this heating process, the respective ceramic materials are preferably sintered to between twenty five percent to one hundred percent of their desired final density, as measured by the percentage of shrinkage during sintering. Alternatively, the heating process proceeds to a temperature sufficient to sinter the respective ceramic materials to a percentage of the desired final density for the respective materials such that subsequent heating and sintering will result in compatible shrinkage of all ceramic materials. The sintering temperature is selected to achieve the desired properties, including a dense electrolyte, porous anode and cathode, and dense interconnect. The interconnect elements 38, 38', 138, or 140 may be heat treated individually, to a temperature sufficient to sinter the interconnect ceramic material to a percentage of the desired final density for the interconnect ceramic material such that the interconnect ceramic material will not diffuse into adjacent layers of the stacked array during subsequent heating and sintering of the stacked array. The corrugated electrolyte trilayer 36, or the assembled electrolyte trilayer 142 and anode 130' and cathode 132' are separately heat treated as above. These densified components are then preferably allowed to cool to a temperature which allows handling. This initial heat treatment may proceed to the point of only partially sintering the assemblies. Thus, the assembled elements are sintered to at least about twenty five percent of the total sintering required for the final fuel cell as measured by the shrinkage of the materials required to achieve the final desired densities. Preferably, the assembled elements are sintered to between eighty to one hundred percent of their final densities.

The sintered and densified components are then assembled and bonded in their proper sequences into a monolithic structure or stacked assembly 48. During the assembly of the densified components, the contacting surfaces are wetted with a bonding agent 50. The bonding agent 50 is preferably a viscous slurry of anode material or cathode material, and possibly interconnect material, mixed with a compatible binder, plasticizer, and solvent which is brushed 54 or sprayed onto the elements. The selection of the component materials incorporated into the bonding agent 50 is dependent upon the surfaces to be interbonded. To bond two cathode surfaces only cathode materials are used, and similarly to bond an anode surface to an interconnect surface both anode and interconnect materials are used. Similarly, to bond two anode surfaces, only anode materials are used. However, to bond a cathode surface to an interconnect surface both cathode and interconnect materials may be used. By way of example, the bonding agent 50 is formed by combining the selected ceramic component materials with polyvinyl butyryl resin, butyl benzyl phthalate, and isopropyl alcohol into a viscous slurry. Alternatively, the bonding agent 50 may be formed by combining the selected ceramic component materials with materials such as a ceramic paste base, zirconia cement, cellulose-ether compound, a glass-ceramic, or an organo-metallic sol-gel material. Platinum ink or platinum powder may also be added to the bonding agent 50 to improve the electrical conductivity within the MSOFC 20 (or 110).

The stacked assembly 48 is then heat treated, preferably in a furnace or microwave oven 134 operating at temperatures of 1000°-1400° C., to sinter and densify the bonding agent 50. By way of example, the stacked assembly 48 is heated at ramp rates of 10°-50° C. per hour to 1200° C. The temperature is maintained at 1200° C. for 1 hour, and then the stacked assembly 48 is allowed to gradually cool down. Microwave heating is preferably carried out at a frequency of 28 Giga-Hertz. In this heat treating procedure, the organics and volatile components of the bonding agent 50 are burned out or outgassed and the component materials (anode, cathode, and interconnect) are sintered to bond adjacent contacting surfaces of the previously sintered and densified subassemblies. This two step sintering and densifying process reduces the thermal induced cracking, slumping of the corrugations, and diffusion of the component materials into adjacent layers, while allowing assembly of a monolithic core having a very high number of individual cells. It should be noted that during the assembly of the sintered subassemblies into the stacked monolith and during the heat treating of the monolith, a compressive force may be applied to promote contact and interbonding at the adjacent surfaces.

It should be evident from the foregoing description that the present invention provides many advantages in the field of manufacturing monolithic solid oxide fuel cells. Although preferred embodiments are specifically illustrated and described herein, it will be appreciated that many modifications and variations of the present invention are possible in light of the above teaching to those skilled in the art. It is preferred, therefore, that the present invention be limited not by the specific disclosure herein, but only by the appended claims.

We claim:
1. A method of constructing a monolithic solid oxide fuel cell comprising the steps of:
   mixing ceramic powders required to make an anode, a cathode, an electrolyte, and an interconnect each individually with a binder system to form a batch of each of said materials;
   forming thin tapes of each of said material batches;
   attaching said anode tape onto said electrolyte tape and said cathode tape on an opposite side of said electrolyte tape to form a trilayer electrolyte tape;
   shaping said trilayer electrolyte tape to form fuel flow pathways extending along said anode, and oxidant flow pathways extending along said cathode of said trilayer electrolyte tape;
   cutting said trilayer electrolyte tape to form a plurality of trilayer electrolyte elements having a desired gross net shape;
   cutting said interconnect tape to form a plurality of interconnect elements having a desired gross net shape;
   heating said trilayer electrolyte elements and said interconnect elements to a temperature sufficient to cause removal of the binder system and to at least initiate partially sintering of the respective ceramic materials to a partially sintered condition;
   stacking a plurality of said partially sintered trilayer electrolyte elements alternately with a plurality of said partially sintered interconnect elements, subsequent to said heating step, to form a stacked array; and
   processing said stacked array to bond contacting surfaces of said alternately stacked trilayer electrolyte and interconnect elements.

2. The method of claim 1, wherein said attaching step is further characterized by:
   roll milling said anode tape, said electrolyte tape, and said cathode tape within a two roll mill to bond the respective contacting surfaces together.

3. The method of claim 1, wherein said mixing step is further characterized by:
   selecting a cermet of cobalt or nickel metal with stabilized zirconia for said anode, strontium-doped lanthanum manganite for said cathode, yttria-stabilized zirconia for said electrolyte, and doped lanthanum chromite for said interconnect; and selecting said binder system for compatibility with said anode, cathode, electrolyte, and interconnect materials, said binder system including a binder and a plasticizer.

4. The method of claim 1, wherein said steps of forming said thin tapes and shaping said trilayer electrolyte tapes is further characterized by:
fabricating said materials by a process selected from the methods consisting of roll milling, extruding, pressing and tape casting.

5. The method of claim 1, wherein said steps of forming said thin tapes and said step of attaching said anode and cathode tapes to said electrolyte are further characterized by:
tape casting said electrolyte onto one of said anode and cathode tapes; and
tape casting said other of said cathode and anode onto an opposite side of said electrolyte tape.

6. The method of claim 1, wherein said attaching step is further characterized by:
wetting adjacent surfaces of said anode, electrolyte, and cathode tapes with a solution capable of at least partially dissolving said binder system of said tapes.

7. The method of claim 1, wherein said step of shaping said trilayer electrolyte tape to form said fuel and oxidant flow pathways is further characterized by:
deforming the respective surfaces of said anode layer and said cathode layer of said trilayer electrolyte tape by displacing contiguous portions of said surfaces from the plane of the pre existing flat surface, leaving raised surface portions to form a ribbed, finned, or pillared anode and cathode surface configuration.

8. The method of claim 7, wherein said step of shaping said pathways is further characterized by:
deforming said surfaces of said anode and cathode by a process selected from the group consisting of pressing, rolling, and cutting.

9. The method of claim 1, wherein said heating step is further characterized by:
raising the temperature of said respective trilayer electrolyte elements and said interconnect elements by any one or a combination of heating processes selected from the group consisting of radiant, convective, and microwave heating.

10. The method of claim 1, wherein said heating step is further characterized by:
raising the temperature of said trilayer electrolyte elements and said interconnect elements to a temperature sufficient to sinter the respective ceramic materials to at least 25% of the total material shrinkage resulting from sintering the ceramic materials to a desired final density.

11. The method of claim 1, wherein said heating step is further characterized by:
raising the temperature of said trilayer electrolyte elements and said interconnect elements to a temperature sufficient to sinter the respective ceramic materials to at least 80% of the total material shrinkage resulting from sintering the ceramic materials to a desired final density.

12. The method of claim 1, wherein said heating step is further characterized by:
raising the temperature of said trilayer electrolyte elements and said interconnect elements to a temperature sufficient to sinter the respective ceramic materials to a percentage of the desired final density for said respective materials such that subsequent heating and sintering of said stacked array will result in compatible shrinkage of all ceramic materials in said stacked array.

13. The method of claim 1, wherein said stacking step is further characterized by:
wetting adjacent surfaces of said interconnect elements and said anode of said trilayer electrolyte elements with an anode bonding agent; and
wetting adjacent surfaces of said interconnect elements and said cathode of said trilayer electrolyte elements with a cathode bonding agent.

14. The method of claim 13, wherein said anode and cathode bonding agents utilized in said stacking step are further characterized by:
mixing powders of said anode ceramic material for said anode bonding agent, and said cathode ceramic material for said cathode bonding agent respectively, with a bonding material.

15. The method of claim 14, wherein said heating step is further characterized by:
raising the temperature of said interconnect elements to a temperature sufficient to sinter the ceramic material to a percentage of the desired final density for said material such that said interconnect ceramic material will not diffuse into adjacent layers of said stacked array during subsequent heating and sintering of said stacked array.

16. The method of claim 14 wherein said bonding material further comprises:
a binder selected from the group consisting of synthetic rubber, plastics, polyvinyl alcohol, polyvinyl butyryl resin, cellulose, and polymer systems which thermally decompose without cross linking;
a plasticizer selected from the group consisting of butyl benzyl phthalate and solvents of the phthalate group; and
a solvent, said ceramic materials, said binder, said plasticizer, and said solvent mixed together to form a viscous slurry.

17. The method of claim 14 wherein said bonding material further comprises:
a ceramic paste material including at least one of the materials selected from the group consisting of ceramic cements, glass ceramics, an organo-metallic sol gel material, and zirconium oxide.

18. The method of claim 14 wherein said bonding material of said bonding agents further comprise: a binder, a plasticizer, and platinum.

19. The method of claim 1, wherein said processing step is further characterized by:
raising the temperature of said stacked array by any one or a combination of heating processes selected from the group consisting of radiant, convective, and microwave heating.

20. The method of claim 1, wherein said processing step is further characterized by:
raising the temperature of said stacked array to a temperature sufficient to sinter the respective ceramic materials to their desired final density.

21. The method of claim 1, wherein said step of shaping said pathways is further characterized by:
deforming said trilayer electrolyte elements to a corrugated or backfolded configuration.

22. The method of constructing a fuel cell according to claim 1, further comprising the steps of:
attaching sections of said anode tape onto one side of said interconnect tape;

attaching sections of said cathode tape on an opposite side of said interconnect tape to form a trilayer interconnect tape;

cutting said trilayer interconnect tape to form a plurality of trilayer interconnect elements;

shaping sections of said trilayer electrolyte or interconnect elements into a desired configuration selected from the group consisting of corrugated and backfolded configurations; and stacking said shaped trilayer elements on the other of said trilayer elements prior to initially heating said stacked trilayer elements.

23. The method of claim 22, wherein said step of stacking said shaped trilayer element on the other of said trilayer elements is repeated to form a stack of up to ten pairs of trilayer elements.

24. A method of constructing a fuel cell comprising the steps of:

mixing ceramic powders required to make an anode, a cathode, an electrolyte, and an interconnect each individually with a binder system to form a batch of each of said materials;

forming thin tapes of each of said materials;

attaching said anode tape onto said electrolyte tape and said cathode tape on an opposite side of said electrolyte tape to form a trilayer electrolyte tape;

forming a plurality of parallel fuel and oxidant passageways extending along said anode and said cathode respectively;

cutting said trilayer electrolyte tape to form a plurality of trilayer electrolyte elements having a desired gross net shape;

cutting said interconnect tape to form a plurality of interconnect elements having a desired gross net shape;

heating said trilayer electrolyte elements and said interconnect elements to a temperature and for a duration sufficient to cause removal of the binder system and to partially sinter the respective ceramic materials to a percentage of the desired final density for said respective materials such that subsequent heating and sintering will result in a compatible shrinkage of all of said ceramic materials;

cooling said at least partially sintered trilayer electrolyte and interconnect elements;

wetting one surface of said interconnect elements and a surface of said anode of said trilayer electrolyte elements with an anode bonding agent, said anode bonding agent including powders of said anode ceramic material, interconnect ceramic materials, binder system materials, and a solvent mixed into a viscous slurry;

wetting the opposite surface of said interconnect elements and the surface of said cathode of said trilayer electrolyte elements with a cathode bonding agent, said cathode bonding agent including powders of said cathode ceramic material, interconnect ceramic materials, binder system materials, and a solvent mixed into a viscous slurry;

stacking a plurality of said at least partially sintered trilayer electrolyte elements alternately with a plurality of said partially sintered interconnect elements to form a stacked array; and processing said stacked array to bond the contacting surfaces of said alternately stacked trilayer electrolyte and interconnect elements.

25. The method of claim 24, wherein said mixing step is further characterized by:

selecting a cermet of cobalt or nickel metal with stabilized zirconia for said anode, strontium-doped lanthanum manganite for said cathode, yttria-stabilized zirconia for said electrolyte, and lanthanum chromite doped with a compound selected from the group consisting of magnesium, calcium cobalt, and strontium, for said interconnect; and selecting said binder system for compatibility with said anode, cathode, electrolyte, and interconnect materials, said binder system including a binder selected from the group consisting of synthetic rubber, thermosetting plastics, polyvinyl alcohol, polyvinyl butyryl resin, and polymer systems which thermally decompose without cross linking, and a plasticizer selected from the group consisting of butyl benzyl phthalate and solvents of the phthalate group.

26. The method of claim 25, wherein said heating step and said processing step are further characterized by:

raising the temperature of said ceramic materials by any one or a combination of heating processes selected from the group consisting of radiant, convective, and microwave heating.

27. A method of constructing a monolithic solid oxide fuel cell having a plurality of stacked cells, each cell including a cathode, an electrolyte, and an anode, said cells being separated from one another by an interconnect, comprising the steps of:

assembling a plurality of trilayer electrolyte elements each including respective layers of at least partially but not completely sintered cathode ceramic materials, electrolyte ceramic materials, and anode ceramic materials, said trilayer electrolyte elements including fuel and oxidant flow pathways formed into the respective surfaces of said anode layer and said cathode layer by displacing contiguous portions of said surfaces from the plane of the pre-existing flat surface leaving raised surface portions, said trilayer electrolyte elements having a desired configuration;

forming a plurality of interconnect elements each including at least partially but not completely sintered interconnect ceramic materials in a desired configuration;

wetting one surface of said interconnect elements and the surface of said anode of said trilayer electrolyte elements with an anode bonding agent, said anode bonding agent including powders of said anode ceramic material, said interconnect ceramic materials, a binder system materials, and a solvent mixed into a viscous slurry;

wetting the opposite surface of said interconnect elements and the surface of said cathode of said trilayer electrolyte elements with a cathode bonding agent, said cathode bonding agent including powders of said cathode ceramic material, said interconnect ceramic material, said binder system materials, and a solvent mixed into a viscous slurry;

stacking a plurality of said at least partially sintered trilayer electrolyte elements alternately with a plurality of said interconnect elements to form a stacked array; and processing said stacked array to bond contacting surfaces of said alternately stacked trilayer electrolyte and interconnect elements.

28. The method of claim 27, further characterized by:

selecting a cermet of cobalt or nickel metal with stabilized zirconia for said anode, strontium-doped lanthanum manganite for said cathode, yttria-stabilized zirconia for said electrolyte, and doped lanthanum chromite for said interconnect;

selecting said binder system materials of said anode bonding agent and said cathode bonding agent for compatibility with said anode, cathode, electrolyte, and interconnect materials, said binder system materials including a binder selected from the group consisting of synthetic rubber, plastics, polyvinyl alcohol, polyvinyl butyryl resin, and polymer systems which thermally decompose without cross linking, and a plasticizer selected from the group consisting of butyl benzyl phthalate and solvents of the phthalate group; and selecting isopropyl alcohol for said solvent of said anode bonding agent and said cathode bonding agent.

29. The method of claim 27, further characterized by:

configuring said plurality of trilayer electrolyte elements and said plurality of interconnect elements to include aligned integral fuel inlet, fuel outlet, oxidant inlet, and oxidant outlet manifolds at spaced apart locations;

enclosing said fuel pathway extending along said anode of said plurality of electrolyte layers such that said fuel pathways extend from said fuel inlet manifold to said fuel outlet manifold; and enclosing said oxidant pathways extending along said cathode of said plurality of electrolyte layers such that said oxidant pathways extend from said oxidant inlet manifold to said oxidant outlet manifold.

30. A method of constructing a monolithic solid oxide fuel cell having a plurality of stacked cells, each cell including a cathode, an electrolyte, and an anode, said cells being separated from one another by an interconnect, comprising the steps of:

assembling a plurality of electrolyte trilayer elements each including respective layers of cathode ceramic materials, electrolyte ceramic materials, and anode ceramic materials, in a desired configuration;

forming a plurality of interconnect trilayer elements each including anode ceramic materials and cathode ceramic materials sandwiching therebetween interconnect ceramic materials in a desired configuration;

bonding one of said electrolyte trilayer elements and one of said interconnect trilayer elements together such that only one of said anode and said cathode ceramic materials is sandwiched between electrolyte ceramic material and interconnect ceramic material;

heating said bonded pairs of electrolyte and interconnect trilayer elements to a temperature sufficient to at least partially but not completely sinter said respective ceramic materials to form cell elements;

stacking a plurality of said cell elements to form a stacked array; and processing said stacked array to bond the contacting surfaces of said stacked cell elements.

31. The method according to claim 30 wherein said electrolyte trilayer elements are bonded to said interconnect trilayer elements sandwiching anode ceramic material between said electrolyte ceramic material and said interconnect ceramic material, said stacking step further comprising:

wetting exposed cathode surfaces of said cell elements with a cathode bonding agent, said cathode bonding agent including powders of said cathode ceramic material, a binder system materials, and a solvent mixed into a viscous slurry.

32. The method according to claim 30 wherein said electrolyte trilayer elements are bonded to said interconnect trilayer elements sandwiching cathode ceramic material between said electrolyte ceramic material and said interconnect ceramic material, said stacking step further comprising:

wetting exposed anode surface of said cell elements with an anode bonding agent, said anode bonding agent including powders of said anode ceramic material, a binder system materials, and a solvent mixed into a viscous slurry.

33. The method of claim 30, further characterized by:

configuring said plurality of electrolyte trilayer elements and said plurality of interconnect trilayer elements to include aligned integral fuel inlet, fuel outlet, oxidant inlet, and oxidant outlet manifolds at spaced apart locations;

forming a plurality of fuel passageways extending through said anode ceramic material from said fuel inlet manifold to said fuel outlet manifold; and forming a plurality of oxidant passageways extending through said cathode ceramic material from said oxidant inlet manifold to said oxidant outlet manifold.

34. The method of claim 30, further characterized by:

selecting a cermet of cobalt or nickel metal with stabilized zirconia for said anode, strontium-doped lanthanum manganite for said cathode, yttria-stabilized zirconia for said electrolyte, and doped lanthanum chromite for said interconnect.

35. An apparatus for constructing a monolithic solid oxide fuel cell having a plurality of stacked cells, each cell including a cathode, an electrolyte, and an anode, said cells being separated from one another by an interconnect, the apparatus comprising:

a plurality of electrolyte elements each including respective layers of cathode ceramic materials, electrolyte ceramic materials, and anode ceramic materials all being partially sintered, said electrolyte elements configured to include fuel and oxidant flow pathways, said electrolyte elements shaped in a desired configuration;

a plurality of interconnect elements each including interconnect ceramic materials in a desired configuration and being partially sintered, alternately stacking said interconnect elements with said plurality of electrolyte elements to form a stacked array; and bonding agent means for bonding said partially sintered interconnect elements to said partially sintered electrolyte elements.

36. The apparatus of claim 35 wherein said bonding agent means further comprises:

an anode bonding agent including powders of said anode ceramic material, a binder system material, and a solvent mixed into a viscous slurry for bonding one surface of said interconnect elements to said anode of said electrolyte elements; and a cathode bonding agent including powders of said cathode ceramic material, said binder system material, and a solvent mixed into a viscous slurry for bonding the opposite surface of said interconnect elements to said cathode of said electrolyte elements.

37. The apparatus of claim 36, wherein said anode bonding agent and said cathode bonding agent each further include interconnect ceramic materials mixed into said respective viscous slurries.

38. The apparatus of claim 37, wherein said ceramic materials further comprise:
   a cermet of cobalt or nickel metal with stabilized zirconia for said anode;
   strontium-doped lanthanum manganite for said cathode;
   yttria-stabilized zirconia for said electrolyte; and
   lanthanum chromite doped with a compound selected from the group consisting of magnesium, calcium cobalt, and strontium, for said interconnect.

39. The apparatus of claim 38, wherein said binder system material of said bonding agent means further comprises:
   a binder selected from the group consisting of synthetic rubber, plastics, polyvinyl alcohol, polyvinyl butyryl resin, and polymer systems which thermally decompose without cross linking; and
   a plasticizer selected from the group consisting of butyl benzyl phthalate and solvents of the phthalate group.

40. The apparatus of claim 36, wherein said anode bonding agent and said cathode bonding agent each further include powdered platinum mixed into said respective viscous slurries.

41. The apparatus of claim 35 wherein said bonding agent means further comprises:
   a ceramic paste material including at least one of the materials selected from the group consisting of ceramic cements, glass ceramics, an organo-metallic sol gel material, and zirconium oxide.

42. A bonding agent for use in bonding the contacting surfaces of ceramic elements of a monolithic solid oxide fuel cell which ceramic elements are at least partially but not completely sintered, said bonding agent comprising:
   ceramic materials selected from the group consisting of anode ceramics, cathode ceramics, and interconnect ceramics;
   a binder selected from the group consisting of synthetic rubber, plastics, polyvinyl alcohol, polyvinyl butyryl resin, and polymer systems which thermally decompose without cross linking;
   a plasticizer selected from the group consisting of butyl benzyl phthalate and solvents of the phthalate group; and
   a solvent, said ceramic material, said binder, said plasticizer, and said solvent mixed together to form a viscous slurry.

43. The bonding agent of claim 42, wherein said ceramic materials further comprise:
   a cermet of cobalt or nickel metal with stabilized zirconia for said anode ceramic;
   strontium-doped lanthanum manganite for said cathode ceramic;
   yttria-stabilized zirconia for said electrolyte ceramic; and
   doped lanthanum chromite for said interconnect ceramic.

44. The bonding agent of claim 42, further comprising powdered platinum mixed into said viscous slurries.

45. A monolithic solid oxide fuel cell constructed according to the process steps of:
   mixing ceramic powders required to make an anode, a cathode, an electrolyte, and an interconnect each individually with a binder system to form a batch of each of said materials;
   forming thin tapes of each of said material batches;
   attaching said anode tape onto said electrolyte tape and said cathode tape on an opposite side of said electrolyte tape to form a trilayer electrolyte tape;
   shaping said trilayer electrolyte tape to form fuel flow pathways extending along said anode, and oxidant flow pathways extending along said cathode of said trilayer electrolyte tape;
   cutting said trilayer electrolyte tape to form a plurality of trilayer electrolyte elements having a desired gross net shape;
   cutting said interconnect tape to form a plurality of interconnect elements having a desired gross net shape;
   heating said trilayer electrolyte elements and said interconnect elements to a temperature sufficient to cause removal of the binder system and initiate sintering of the respective ceramic materials to a partially sintered condition;
   stacking a plurality of said partially sintered trilayer electrolyte elements alternately with a plurality of said partially sintered interconnect elements, subsequent to said heating step, to form a stacked array; and
   processing said stacked array to bond contacting surfaces of said alternately stacked trilayer electrolyte and interconnect elements.

46. A monolithic solid oxide fuel cell constructed according to the process steps of:
   mixing ceramic powders required to make an anode, a cathode, an electrolyte, and an interconnect each individually with a binder system to form a batch of each of said materials;
   forming thin tapes of each of said materials;
   attaching said anode tape onto said electrolyte tape and said cathode tape on an opposite side of said electrolyte tape to form a trilayer electrolyte tape;
   forming a plurality of parallel fuel and oxidant passageways extending along said anode and said cathode respectively;
   cutting said trilayer electrolyte tape to form a plurality of trilayer electrolyte elements having a desired gross net shape;
   cutting said interconnect tape to form a plurality of interconnect elements having a desired gross net shape;
   heating said trilayer electrolyte elements and said interconnect elements to a temperature and for a duration sufficient to cause removal of the binder system and to partially sinter the respective ceramic materials to a percentage of the desired final density for said respective materials such that subsequent heating and sintering will result in a compatible shrinkage of all of said ceramic materials;
   cooling said at least partially sintered trilayer electrolyte and interconnect elements;
   wetting one surface of said interconnect elements and a surface of said anode of said trilayer electrolyte elements with an anode bonding agent, said anode bonding agent including powders of said anode ceramic material, interconnect ceramic materials, binder system materials, and a solvent mixed into a viscous slurry;
   wetting the opposite surface of said interconnect elements and the surface of said cathode of said trilayer electrolyte elements with a cathode bonding agent, said cathode bonding agent including powders of said cathode ceramic material, interconnect ceramic materials, binder system materials, and a solvent mixed into a viscous slurry;

stacking a plurality of said at least partially sintered trilayer electrolyte elements alternately with a plurality of said partially sintered interconnect elements to form a stacked array; and processing said stacked array to bond the contacting surfaces of said alternately stacked trilayer electrolyte and interconnect elements.

47. A monolithic solid oxide fuel cell having a plurality of stacked cells, each cell including a cathode, an electrolyte, and an anode, said cells being separated from one another by an interconnect, constructed according to the process steps of:

assembling a plurality of trilayer electrolyte elements each including respective layers of at least partially but not completely sintered cathode ceramic materials, electrolyte ceramic materials, and anode ceramic materials, said trilayer electrolyte elements including fuel and oxidant flow pathways formed into the respective surfaces of said anode layer and said cathode layer by displacing contiguous portions of said surfaces from the plane of the pre-existing flat surface leaving raised surface portions, said trilayer electrolyte elements having a desired configuration;

forming a plurality of interconnect elements each including at least partially but not completely sintered interconnect ceramic materials in a desired configuration;

wetting one surface of said interconnect elements and the surface of said anode of said trilayer electrolyte elements with an anode bonding agent, said anode bonding agent including powders of said anode ceramic material, said interconnect ceramic materials, a binder system materials, and a solvent mixed into a viscous slurry;

wetting the opposite surface of said interconnect elements and the surface of said cathode of said trilayer electrolyte elements with a cathode bonding agent, said cathode bonding agent including powders of said cathode ceramic material, said interconnect ceramic material, said binder system materials, and a solvent mixed into a viscous slurry;

stacking a plurality of said at least partially sintered trilayer electrolyte elements alternately with a plurality of said interconnect elements to form a stacked array; and processing said stacked array to bond the contacting surfaces of said alternately stacked trilayer electrolyte and interconnect elements.

48. A method of making a monolithic ceramic solid oxide fuel cell having a plurality of electrolyte trilayer walls each of electrolyte ceramic sandwiched between opposite layers of anode and cathode ceramic, said electrolyte trilayer walls being alternately stacked with plural walls of interconnect ceramic to cooperatively define fuel and oxidant passageways; said method comprising the steps of:

partially sintering said electrolyte trilayer walls;

partially sintering said interconnect walls;

alternately stacking said partially sintered trilayer walls with said partially sintered interconnect walls; and finish sintering said alternately stacked walls to interbond the latter into a ceramic monolith.

* * * * *